United States Patent
Bartels (10) Patent No.: US 7,504,932 B2
(45) Date of Patent: Mar. 17, 2009

(54) METHOD AND DEVICE FOR MONITORING BLIND SPOTS OF A MOTOR VEHICLE

(75) Inventor: Arne Bartels, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 236 days.

(21) Appl. No.: 10/531,089

(22) PCT Filed: Oct. 2, 2003

(86) PCT No.: PCT/EP03/10960

§ 371 (c)(1),
(2), (4) Date: Sep. 8, 2005

(87) PCT Pub. No.: WO2004/036244

PCT Pub. Date: Apr. 29, 2004

(65) Prior Publication Data

US 2006/0070787 A1    Apr. 6, 2006

(30) Foreign Application Priority Data

Oct. 10, 2002   (DE) ............................... 102 47 290

(51) Int. Cl.
*B60Q 21/00* (2006.01)
(52) U.S. Cl. .................... 340/435; 340/903; 340/436; 340/439; 340/438
(58) Field of Classification Search ................ 340/903, 340/435, 436, 439, 438, 463, 466
See application file for complete search history.

(56) References Cited

U.S. PATENT DOCUMENTS 3,891,966 A * 6/1975 Sztankay .................... 340/903
5,235,316 A * 8/1993 Qualizza ..................... 340/436
5,325,096 A   6/1994 Pakett (Continued)

FOREIGN PATENT DOCUMENTS

EP        0 936471        8/1999

(Continued)

OTHER PUBLICATIONS

Search Report, German Patent Application No. 102 47 290.4, dated Jul. 28, 2003.

(Continued)

*Primary Examiner*—Jeff Hofsass
*Assistant Examiner*—Nwugo Ojaiko
(74) *Attorney, Agent, or Firm*—Kenyon & Kenyon LLP (57) ABSTRACT

A method for monitoring the blind spot at the side of a motor vehicle, a warning function being activated which gives out a warning to the driver if an object is located in a warning region, includes the following steps: a) determining the relative speed between the object and the motor vehicle, determining the travel direction of the object relative to the motor vehicle, and determining the position of the object relative to the motor vehicle within a sensor region; and b) giving out a warning to the driver if the travel direction of the object corresponds to that of the motor vehicle, the relative speed between the object and the motor vehicle is within a predetermined range, defined by a lower range boundary and an upper range boundary, the predetermined region including the relative speed zero, and the position of the object being within the warning region.

14 Claims, 5 Drawing Sheets

U.S. PATENT DOCUMENTS

| | | | |
|---|---|---|---|
| 5,339,075 A | | 8/1994 | Abst et al. |
| 5,530,447 A | | 6/1996 | Henderson et al. |
| 6,265,968 B1 | | 7/2001 | Betzitza et al. |
| 6,737,964 B2 * | | 5/2004 | Samman et al. ............. 340/436 |
| 6,911,642 B2 | | 6/2005 | Sartori et al. |
| 2001/0013835 A1 * | | 8/2001 | Hsu et al. .................. 340/905 |
| 2002/0082777 A1 * | | 6/2002 | Halsted et al. ............. 701/301 |
| 2002/0183929 A1 * | | 12/2002 | Tsuji et al. ................. 701/301 |
| 2003/0075145 A1 * | | 4/2003 | Sheidler et al. ............ 123/396 |
| 2003/0141762 A1 * | | 7/2003 | Sartori et al. ............. 307/10.1 |

FOREIGN PATENT DOCUMENTS

| | | |
|---|---|---|
| EP | 1 026 522 | 8/2000 |
| WO | WO 9404941 | 3/1994 |
| WO | WO 01/61371 | 8/2001 |

OTHER PUBLICATIONS

Reed, "Side Zone Automotive Radar," Radar Conference, 1997, IEEE International, Syracuse, NY, May 13 to 15, 1997, New York, NY, IEEE, May 13, 1997, pp. 186 to 190, XP010224762, ISBN 0-7803-3731-X, p. 186, right column, paragraph 4.

* cited by examiner

METHOD AND DEVICE FOR MONITORING BLIND SPOTS OF A MOTOR VEHICLE

FIELD OF THE INVENTION

The present invention relates to a method and a device for monitoring blind spots of a motor vehicle.

BACKGROUND INFORMATION

A driver of a vehicle is able directly to examine the region around his vehicle through the vehicle's windows, and indirectly through the vehicle's rear view mirrors. In this context, the driver is able to examine through the vehicle's windows predominantly the region in front of the vehicle and at the sides of the vehicle, whereas the region behind the vehicle may be examined using the vehicle's inside rearview mirror, and the regions laterally behind the vehicle may be examined using one or more of the vehicle's outer rearview mirrors.

Because of the restricted field of view of the driver and the geometrical relationships in a vehicle, that is, for example, because of posts between the vehicle's windows that hinder vision, it is generally not possible for the driver of the vehicle to examine all the regions around a vehicle without turning around or turning the head. Directly behind and in front of the vehicle there are regions that the driver is not able to examine. Similarly, there are regions at the side of the vehicle that the driver is not able to examine without a considerable change in the field of vision by turning his head. These difficult-to-examine regions at the sides of the vehicle are designated as blind spot regions of the vehicle, this region varying depending on the size and sitting position of the driver as well as with the kind and the setting of the outside mirrors.

European Published Patent Application No. 1 026 522 describes a system for monitoring a region at the side of a vehicle in a dynamic traffic environment. In this context, the system has an IR transmitting unit and an IR receiving unit which are situated at the side of the vehicle. These IR transmitting and receiving units define a lateral region that is to be monitored, an evaluating unit establishing whether an object is located in the monitoring region. The presence of an object in the monitored region is notified to the driver via a suitable display unit. A disadvantage is that object may be pointed out to the driver that are meaningless for the guidance of the vehicle.

SUMMARY

In a method and a device for monitoring blind spots of a motor vehicle according to example embodiments of the present invention, the driver may only receive a warning if the object detected in the blind spot has a meaning with respect to the guidance of the vehicle.

The method, according to an example embodiment of the present invention, for monitoring the blind spot at the side of a motor vehicle, that activates a warning function for giving off a warning to the driver if an object is located in a predefined warning range, has the following steps: a) determining the relative speed $v_{rel}$ between an object and a motor vehicle, determining the travel direction of the object relative to the motor vehicle and determining the position of the object relative to the motor vehicle within a predefined sensor range; and b) giving out a warning to the driver if the travel direction of the object corresponds to that of the motor vehicle, the relative speed $v_{rel}$ between the object and the vehicle is within a predetermined range, defined by a lower range boundary $v_u$ and an upper range boundary $v_o$, the predetermined range of the relative speed including zero, and the position of the object (F2) being within the warning range.

In this context, the relative speed is with reference to the motor vehicle, e.g., if the relative speed is greater than zero, the object moves faster than the vehicle, and if the relative speed is less than zero, the object is slower than the vehicle, or two-way traffic is involved. Objects may be, for example, pedestrians, vehicles, bicycles, motorcycles, trucks, buses, etc. Furthermore, the travel direction of the object relative to the motor vehicle is defined by the direction of the roadway on which the object is moving relative to the vehicle. In other words, with respect to the motor vehicle, an object is able to have only one of two travel directions, either it moves in the same travel direction as the vehicle or it moves in the opposite travel direction. In the latter case, then, two-way traffic is involved. As a result, an object that has the relative speed of zero with respect to the vehicle, and changes from an outer lane to a lane adjacent to the vehicle, has the same travel direction as the vehicle, although, with respect to the relative speed, it moves in a perpendicular direction toward the vehicle. Furthermore, the sensor range is predefined by the range of the sensor at which it detects objects, and the warning range is the range within which a warning is given off to the driver, e.g., the blind spot region. In this context, the warning range is a part of the sensor range.

A warning may also be generated at relative speeds greater than the positive upper range boundary $v_o$, i.e., in an example embodiment a warning is generated in response to all positive relative speeds, if the additional, above-named conditions are satisfied.

For example, the predetermined range is defined by the interval of the relative speeds of −30 km/h to +100 km/h, e.g., −15 km/h to +50 km/h, and, e.g., −5 km/h to +30 km/h. This has the background that an object approaching at high speed covers a greater path per unit of time, and consequently has to be monitored already at a greater distance. Example embodiments of the present invention may thus ensure that a driving situation or a warning situation is not only judged based on the fact as to whether an object is located in a static warning range or at a distance or a static warning range or distance that depends on a speed or a driving parameter, but rather, the individual characteristics of the approaching object (such as the speed, the angle, etc. (see FIG. 8)) may be incorporated in the judgment, depending on the situation. For the warning function, therefore, for giving out a warning, the distance and the relative speed as well as possibly, in addition, the angular information (see above) are relevant for each recorded object.

In an example embodiment, the range boundaries are a function of the speed of the motor vehicle, e.g., at a low speed of the vehicle, the range boundaries are lowered, whereas at a high speed, the range boundaries are shifted to higher relative speeds.

The warning function may be independent of the direction of entry of the object into the blind spot, and the direction of exit of the object from the blind spot. Furthermore, the warning function may be independent of the background of the object that enters the blind spot, and independent of standing objects, of their alignment and their background. In an example embodiment, driving situations are classified, each classified driving situation including the information as to whether the warning function is activated or not, when an object enters the blind spot region. The method may also have the following steps: determining the current driving situation of the motor vehicle and the object, ascertaining that classified driving situation which corresponds to the current driving situation, and activating the warning function corresponding to the information of the ascertained classified driving situation.

The classification may take into account two additional lanes laterally to the lane of the motor vehicle. This measure is usually sufficient.

For example, the evaluation of whether a warning function is triggered in response to the entry of an object into a blind spot or warning range of the motor vehicle, is carried out at both sides of the vehicle, e.g., both sides of the motor vehicle are monitored, in order for the monitoring to cover swinging-in procedures as well as passing procedures or lane change in general.

Because an angle is recorded or calculated as an input variable for the warning function in the driving plane of the motor vehicle, which may result from the driving direction of the motor vehicle (F1) and the straight line constructed between a sensor device for monitoring a warning range and the object, additional insights may be obtained for judging the driving situation. If an object is recorded in the warning range (e.g., radial distance undershoots warning threshold), using the additional information on the angle described, a statement may be made as to whether the object is located in an adjacent lane or in a third lane that may be present. If the object is in a third lane, no warning may be required, since swinging out into the middle lane is possible without danger.

A device according to an example embodiment of the present invention for carrying out the method explained above includes a sensor device for monitoring a blind spot, the sensor device determining the direction of motion of an object relative to the motor vehicle, the relative speed between the object and the motor vehicle, as well as the position of the object relative to the vehicle, a control unit for valuing the data ascertained, and a warning device for giving out a warning signal to the driver of the motor vehicle as a function of the valuing of the data. The position of the detected object relative to the vehicle may be determined by measuring the radial distance from the vehicle and measuring the angle at which the object is approaching.

For example, the control device includes a memory for storing classified driving conditions and a comparator for comparing a current driving condition ascertained by the control unit from the data of the sensor device to the classified driving conditions.

The sensor device may be situated in a side mirror, an outer mirror, the rear bumper or a rear light of the motor vehicle, etc.

Example embodiments of the present invention are explained below with reference to the appended Figures.

DETAILED DESCRIPTION

Figure 1:
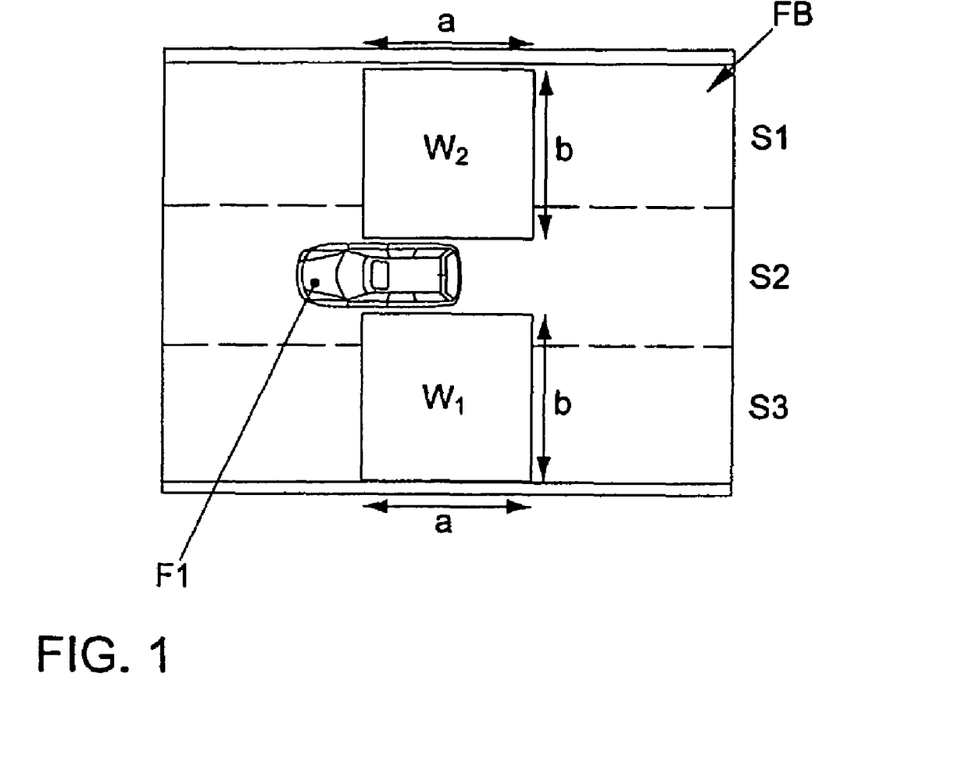
FIG. 1 is a schematic view of a blind spot of a motor vehicle.

FIG. 1 is a schematic view of so-called blind spots on each side of a motor vehicle. What is shown is a motor vehicle F1 which is traveling from right to left in the drawing, in the middle lane S2 of a roadway FB having three lanes S1, S2, S3. Both on the driver's side and on the passenger's side, in each case a rectangular region W1, W2 is illustrated, having edges a, b which define, for example, a rectangle of approximately 5 m×5 m. These approximate regions W1, W2 are defined below as blind spot regions or warning regions, which are not able to be examined by the driver in the outside mirrors. The regions depend on the size and the sitting position of the driver, as well as on the type and the setting of the outside mirrors, as well as on the construction of the vehicle itself.

Furthermore, the size of the blind spot regions depends on the driving situation, such as the speed.

In the following FIGS. 2a to 2c, 3a to 3c, 5a to 5d, 6a to 6c, 7a to 7c and 8a to 8c, that vehicle into whose driver-side blind spot an object is entering, is designated as vehicle F1, and the object is specified by an additional vehicle F2, which is denoted as the object vehicle. The direction of motion of vehicle F1, whose blind spot is being considered, is from right to left in the plane of the drawings.

Figure 2A:
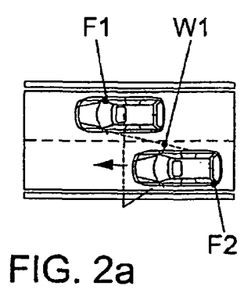
FIGS. 2a to 2c schematically illustrate warning situations in response to selected driving situation.

FIG. 2a illustrates a passing procedure, in which two vehicles F1 and F2 have the same travel direction FR, and vehicle F1 is being slowly passed by faster object vehicle F2. Because of the penetration of object vehicle F2 into the driver's side blind spot region W1 of vehicle F1, a warning is triggered.

Figure 2B:
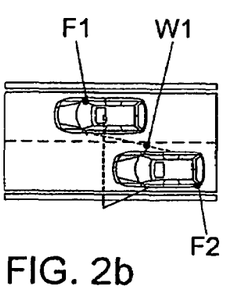

FIG. 2b illustrates a situation comparable to that illustrated in FIG. 2a, in which object vehicle F2, located in blind spot region W1 of vehicle F1, has the same speed as vehicle F1. A warning to the driver of vehicle F1 takes place.

Figure 2C:
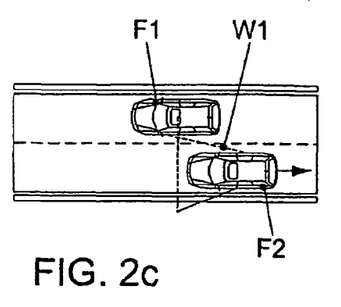

FIG. 2c illustrates a situation in which object vehicle F2 slowly drops back compared to vehicle F1, which is indicated by the arrow directed rearwardly, and wanders through the blind spot of vehicle F1. A warning to the driver of vehicle F1 takes place. Travel direction FR of the two vehicles F1, F2 is identical.

Figure 3A:
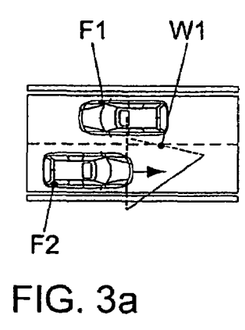
FIGS. 3a to 3c schematically illustrates situations without activation of the warning function.
Figure 3B:
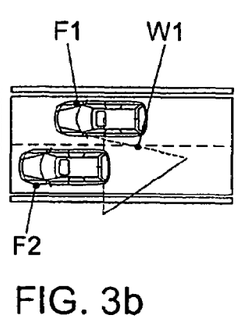
Figure 3C:
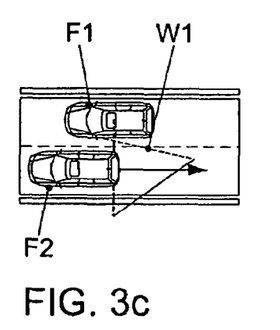

Additional situations, such as those illustrated in FIGS. 3a to 3c, in which a warning function is triggered by the penetration of an object into a blind spot of a vehicle, may be defined both for the driver's side and, analogously, for the passenger's side.

FIG. 3a illustrates a situation in which object vehicle F2 enters the driver's side blind spot W1 of vehicle F1 as two-way traffic. In principle, in the case of two-way traffic, no warning may be given. The perception of an object as constituting two-way traffic takes place, for example, by the detection of a negative relative speed $V_{rel}$ and, judging by the number, high relative speed $V_{rel}$ ($V_{rel} \leq v_u$, see FIG. 4).

FIG. 3b illustrates the passing of vehicle F1 of standing vehicle F2. Here, too, there is no warning in response to an entry of a standing vehicle into the blind spot region of another vehicle. The perception of an object as a standing object takes place, for example, by the detected relative speed $V_{rel}$, which is equal to the characteristic speed $V_{F1}$ of vehicle F1.

FIG. 3c illustrates a situation in which both vehicles move in the same travel direction FR, and object vehicle F2 drops back rapidly with respect to vehicle F1 that is moving in the same direction, which is indicated by the bigger directional arrow illustrated pointing to the right in the drawing. In other words, object vehicle F2 travels through blind spot region W1 of vehicle F1 from front to back, and the situation may be described as a passing procedure of vehicle 1. No warning takes place in this situation. Relative speed $V_{rel}$ of object vehicle F2, detected by vehicle F1, is negative in this context ($V_{rel} \leq V_u$, FIG. 4). However, inasmuch as the object vehicle drops back slowly ($V_u \leq V_{rel} \leq 0$, FIG. 4) no warning takes place.

Furthermore, no warning takes place if the blind spot region of a vehicle is empty independently of the background.

Figure 4:
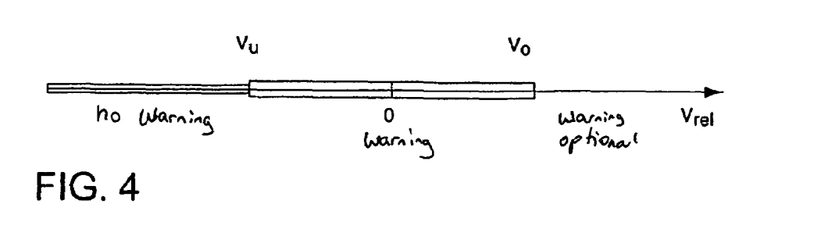
FIG. 4 schematically illustrates a preferred speed range.

FIG. 4 illustrates in an illustrated representation the ranges of relative speeds $V_{rel}$ in which, in response to entry of an object into the blind spot region of a vehicle, a warning takes place or not. In this context, relative speed $v_{rel}$ is referred to the vehicle, so as to arrive at a correct sign definition. In the case of relative speeds lower than a lower boundary $v_u$ between the vehicle and an object, no warning is triggered, in the case of relative speeds $V_{rel}$ within a range between the lower boundary $v_u$ and an upper boundary $v_o$, this range including relative speed zero, a warning is triggered, and in the case of relative speeds greater than upper boundary $v_o$, the triggering of a warning is optional. The range boundaries named may be functions of characteristic speed $V_{F1}$ and of driving parameters (e.g., acceleration procedure, highway travel and expressway travel) of vehicle F1.

FIGS. 5a to 5d illustrate possible entry and exit directions in a blind spot of a vehicle for vehicles going in the same travel direction FR and for two-way traffic. The directions used with respect to the possible entry and exit direction, "right", "left", "front" and "rear" relate to the direction of motion of object vehicle F2.

Figure 5A:
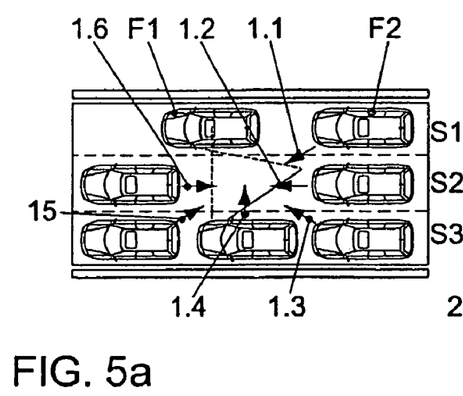
FIGS. 5a to 5d schematically illustrate possible entry directions and exit directions into and out of a blind spot for vehicles in the same driving direction and for two-way traffic.

FIG. 5a schematically illustrates six possible entry directions, indicated by arrows 1.1, 1.2, 1.3, 1.4, 1.5 and 1.6, in which vehicle F2 may enter the driver's side blind spot region W1 of vehicle F1. Also illustrated are three lanes S1, S2, S3 of a roadway FB. The arrows have the following meaning:

1.1 Entry direction at an angle left forward by change of vehicle F2 from lane S1 to lane S2 (relative speed greater than zero), 1.2 Entry direction forward by vehicle F2 remaining in lane S2 (relative speed greater than zero), 1.3 Entry direction at an angle right forward by change of vehicle F2 from lane S3 to lane S2 (relative speed greater than zero), 1.4 Entry direction to the right by change of vehicle F2 from lane S3 to lane S2 (relative speed equal to zero), 1.5 Entry direction at an angle right rearward by change of vehicle F2 from lane S3 to lane S2 (relative speed less than zero), and 1.6 Entry direction rearward by vehicle F2 remaining in lane S2 (relative speed less than zero).

Figure 5B:
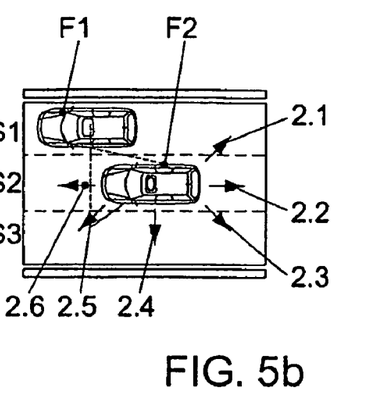

FIG. 5b schematically illustrates six possible exit directions, indicated by arrows 2.1, 2.2, 2.3, 2.4, 2.5 and 2.6, in which vehicle F2 may exit the driver's side blind spot region W1 of vehicle F1. The arrows have the following meaning:

2.1 Exit direction at an angle right rearward by change of vehicle F2 from lane S2 to lane S1 (relative speed less than zero), 2.2 Exit direction rearward by vehicle F2 remaining in lane S2 (relative speed less than zero), 2.3 Exit direction at an angle right rearward by change of vehicle F2 from lane S2 to lane S3 (relative speed less than zero), 2.4 Exit direction at an angle left by change of vehicle F2 from lane S2 to lane S3 (relative speed equal to zero), 2.5 Exit direction at an angle left forward by change of vehicle F2 from lane S3 to lane S2 (relative speed greater than zero), and 2.6 Exit direction forward by vehicle F2 remaining in lane S2 (relative speed greater than zero).

Figure 5C:
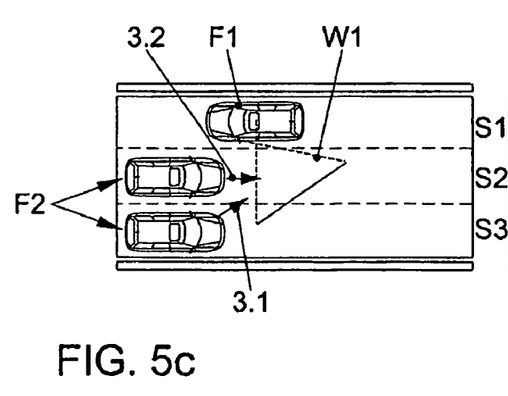

FIG. 5c schematically illustrates two possible entry directions, indicated by arrows 3.1 and 3.2, in which vehicle F2 may enter the driver's side blind spot region W1 of vehicle F1 as two-way traffic. The arrows have the following meaning:

3.1 Entry direction at an angle left forward by change of vehicle F2, that is traveling in the opposite direction to the traffic, from lane S3 to lane S2, and 3.2 Entry direction forward by vehicle F2 remaining in lane S2.

Figure 5D:
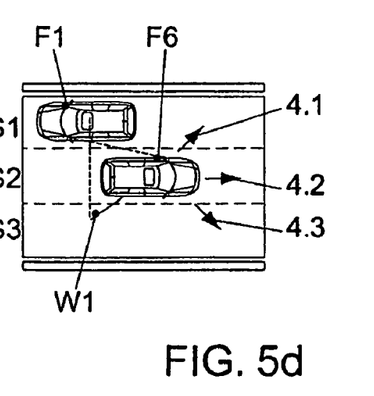

FIG. 5d schematically illustrates three possible exit directions, indicated by arrows 4.1, 4.2 and 4.3, in which vehicle F2 may exit the driver's side blind spot region W1 of vehicle F1. The arrows have the following meaning:

4.1 Exit direction at an angle left forward by change of vehicle F2, that is traveling in the opposite direction to the traffic, from lane S2 to lane S1, 4.2 Exit direction forward by vehicle F2, that is traveling in the opposite direction to the traffic, remaining in lane S2, and 4.3 Exit direction at an angle left forward by change of vehicle F2, that is traveling in the opposite direction to the traffic, from lane S2 to lane S3.

The above-named possible entry and exit directions into a blind spot of a vehicle for vehicles going in the same travel direction and for two-way traffic 1.1 to 1.6, 2.1 to 2.6, 3.1 to 3.2 and 4.1 to 4.3 are used to define the columns of a matrix that describes classified blind spot situations of the driver's side. The rows of the matrix are defined by background objects, such as "no objects", "moving objects", which are subdivided into "passing", "same speed", "dropping back" and "two-way traffic"; and "static objects", such as "pylons", "delineators", "trees", "traffic jam", "guardrail" and "tunnel wall". For every possible classified blind spot situation of the matrix it is stated whether a warning is to be given out in response to the occurrence of the situation.

Figure 6A:
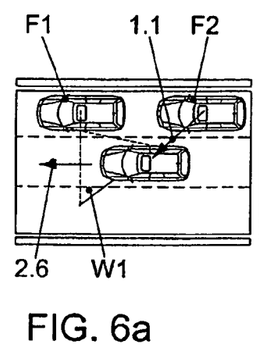
FIGS. 6a to 6c schematically illustrate examples of classified driving situations having triggering of a warning signal.
Figure 6B:
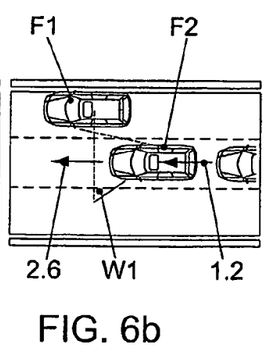
Figure 6C:
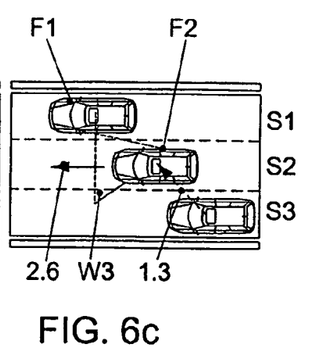

FIGS. 6a to 6c illustrate three examples of a plurality of possible classified driving situations that have triggering of a warning signal which, in parameterized form, are components of the matrix explained above.

FIG. 6a illustrates vehicle F1 moving in lane S1, along with object vehicle F2 traveling behind it, which changes in direction 1.1 to lane S2, and thereby arrives in blind spot region W1 of vehicle F1. Since the travel directions of the vehicles are identical, the relative speed is greater than zero (and is located within the predefined range $v_u$ to $v_o$) and the position P of the object is within the warning range, a warning is triggered. The object vehicle leaves the blind spot region of vehicle F1 again in direction 2.6.

FIG. 6b illustrates vehicle F1 moving in lane S1. In lane S2 parallel to it, object vehicle F2 approaches from behind in direction 1.2, and enters blind spot region W1 of vehicle F1. Since the travel directions of the vehicles are identical, the relative speed $V_{rel}$ is greater than zero (and is located within the predefined range $v_u$ to $v_o$) and the position of the object is within the warning range, a warning is triggered. The object vehicle leaves the blind spot region of vehicle F1 again in direction 2.6.

FIG. 6c illustrates vehicle F1 moving in lane S1. Because of a change of object vehicle F2 in direction 1.3 to lane S3, it arrives in blind spot region W1 of vehicle F1. Since the travel directions FR of the vehicles are identical, the relative speed is greater than zero (and is located within the predefined range $v_u$ to $v_o$) and the object is located within the warning range, a warning is triggered. The object vehicle leaves the blind spot region of vehicle F1 again in direction 2.6.

Figure 7A:
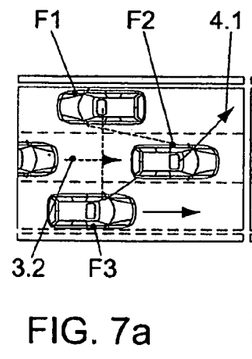
FIGS. 7a to 7c schematically illustrate examples of classified driving situations without triggering of a warning signal.
Figure 7B:
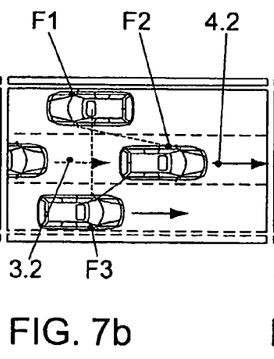
Figure 7C:
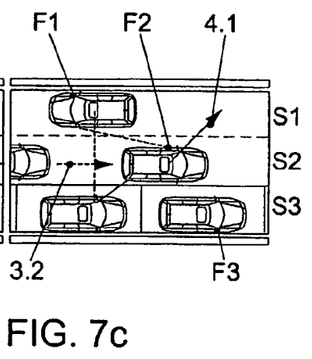

FIGS. 7a to 7c illustrate three examples of a plurality of possible classified driving situations without the triggering of a warning signal.

FIG. 7a illustrates vehicle F1 having blind spot region W1, which is moving in lane S1 in predefined travel direction (i.e., in the plane of the drawing, from right to left). In lane S2, object vehicle F2 moves in opposite travel direction 3.2, and enters blind spot region W1 of vehicle F1. No warning is triggered. The object vehicle leaves the blind spot region again in direction 4.1, that is, while changing lanes to lane S1. In lane S3, an additional vehicle F3 is moving in opposite travel direction FR to vehicle F1. This vehicle is insignificant for the triggering of a warning, since it does not enter blind spot region W1.

FIG. 7b illustrates vehicle F1 having blind spot region W1, which is moving in lane S1 in predefined travel direction FR (i.e., in the plane of the drawing, from right to left). In lane S2, object vehicle F2 moves in opposite travel direction, in direction 3.2, and enters blind spot region W1 of vehicle F1. No warning is triggered. The object vehicle leaves the blind spot region again in direction 4.2, i.e., it remains in lane S2. An additional vehicle F3 moves in lane S3 in the opposite travel direction FR to vehicle F1. This vehicle is insignificant for the triggering of a warning, since it does not enter blind spot region W1.

FIG. 7c illustrates vehicle F1 having blind spot region W1, which is moving in lane S1 in predefined travel direction FR (i.e., in the plane of the drawing, from right to left). In lane S2, object vehicle F2 moves in opposite travel direction FR in direction 3.2, and enters blind spot region W1 of vehicle F1. No warning is triggered. The object vehicle leaves the blind spot region again in direction 4.1, i.e., it changes to lane S1. In lane S3 there is a traffic jam having vehicles F3, or there are parking vehicles. These vehicles F3 are insignificant for the triggering of a warning, since they are standing, and, as a result, are treated as background.

Figure 8:
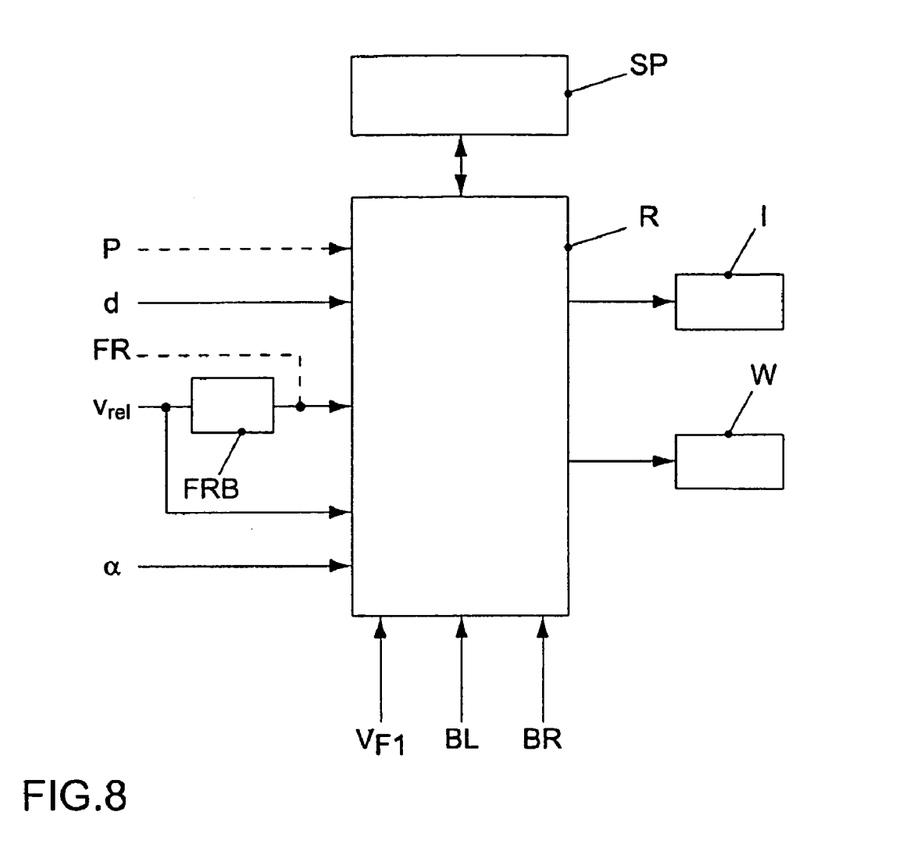
FIG. 8 is a schematic view of a device for monitoring blind spots.

FIG. 8 schematically illustrates a device for monitoring blind spots. A computing device R receives different data about at least one object F2 and/or about one's own driving situation. In this context, the information on object F2 may be made available by a sensor. It is also possible that information about position P of fixed objects are made available by a memory device (such as a navigation unit). Making available data of a position P for computing device R is illustrated in FIG. 8 as a broken line arrow. The ascertainment and notification of a travel direction FR may also be made available by a travel direction ascertaining (such as a navigation unit). Optional information branch P is indicated as a broken line in FIG. 8.

Travel direction determination FRB ascertains travel direction FR from relative speed $V_{rel}$ to a recorded object. In this context, the curve of relative speed over time may also be drawn upon. Thus, travel direction FR of an object F2 that is passing in a lane S2, S3, ($V_{rel}$>0), which drops back again after the passing procedure ($V_{rel}$<0), is evaluated as the same travel direction overall.

Relative speed $V_{rel}$, distance d and angle α between motor vehicle F1 and object F2 (see FIG. 9) are supplied to computing device R. As additional information, characteristic speed $V_{F1}$ and signal are available to computing device R via an operation of the left or right blinker BL, BR. Additional information on the driving situation, such as acceleration value, the steering angle of motor vehicle F1 may be a part of the data supplied to computing unit R. A warning function warns the driver in an information stage I or in a warning stage W1 according to the following scheme:

If a vehicle is recorded in the warning region, this is signaled to the vehicle operator. An intense or urgent warning takes place as soon as the vehicle operator indicates a lane change in this situation by operating a blinker. In this context, the signaling to the vehicle operator may be performed optically and/or acoustically and/or haptically.

To the extent that additional regions next to motor vehicle F1 are monitored by an additional sensor, additional inputs are correspondingly provided at computing device R.

Figure 9:
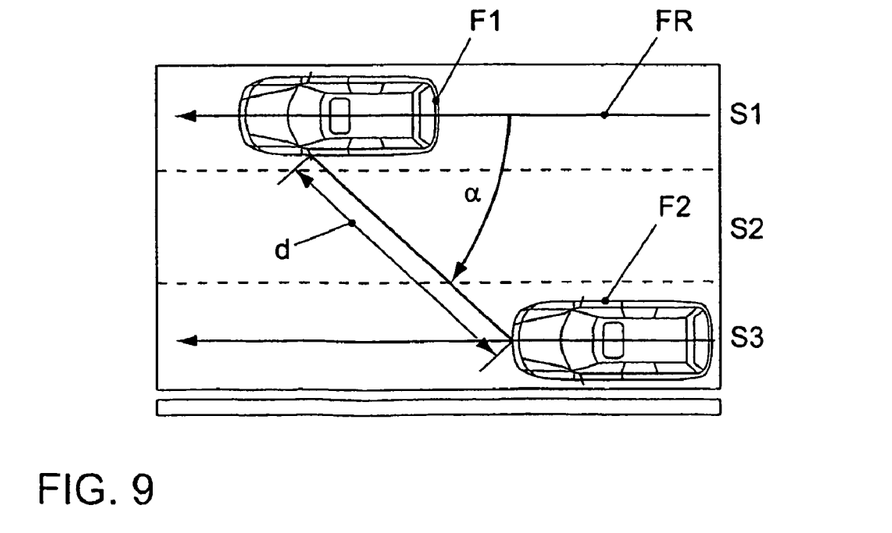
FIG. 9 schematically illustrates a possible definition of an angle between the motor vehicle and an object.

FIG. 9 illustrates a possible definition of an angle α, which is recorded as an input variable for the warning function between motor vehicle F1 and an object F2. In this connection, the angle is defined in the travel plane by the travel direction and the straight line that comes about between a sensor device and object F2 that is to be monitored. How the straight line, and ultimately angle α are exactly defined, in this context (end point at object F2, in the middle at vehicle beginning or at the object center of gravity, or at an object point having the least clearance distance, etc), is immaterial if the corresponding circumstances find consideration for a certain and reliable warning function in computing device R or in the sensor or other control units.

REFERENCE NUMERAL LIST

F1 vehicle
F2 vehicle
F3 vehicle
FB roadway
W1 blind spot driver's side
W2 blind spot passenger's side
S1 lane
S2 lane
S3 lane
FR travel direction
P position
FRB travel direction determination
I information stage
W warning stage
SP memory
BL blinker signal left
BR blinker signal right
R computing unit
α angle
$V_{F1}$ initial speed
d distance
a edge length
b edge length
1.1-1.6 entry directions
2.1-2.6 exit directions
3.1-3.2 entry directions
4.1-4.3 exit directions
$v_{rel}$ relative speed
$v_o$ upper boundary
$v_u$ lower boundary

What is claimed is:

1. A method for monitoring a blind spot located at a side of a motor vehicle to warn a driver of the motor vehicle that an object is located in a predetermined warning region with respect to the motor vehicle corresponding to the blind spot, comprising:

determining a relative speed between the object and the motor vehicle;

determining a travel direction of the object relative to the motor vehicle;

determining a position of the object relative to the motor vehicle; and warning the driver if: (a) the travel direction of the object corresponds to a travel direction of the motor vehicle; (b) the relative speed between the object and the motor vehicle is within a predetermined range bounded by a lower range boundary and an upper range boundary, the predetermined range including a zero value: and (c) the position of the object is within the predetermined warning region.

2. The method according to claim 1, further comprising generating a warning if the relative speed is greater than the upper range boundary.

3. The method according to claim 1, wherein the upper range boundary and the lower range boundary are functions of an initial speed of the motor vehicle.

4. The method according to claim 1, wherein the warning is independent of a direction of entry of the object into the predetermined warning region and is independent of a direction of exit of the object from the predetermined warning region.

5. The method according to claim 1, wherein the warning is independent of a background of the object that enters the predetermined warning region and is independent of standing objects, an alignment of standing objects and a background of the standing objects.

6. The method according to claim 1, further comprising:
classifying driving situations, each classified driving situation including information as to whether the warning be performed if an object enters the predetermined warning region;
determining a current driving situation of the motor vehicle and the object;
ascertaining the classified driving situation that corresponds to the current driving situation; and
activating a warning function that corresponds to the classified driving situation ascertained in the ascertaining step.

7. The method according to claim 6, wherein the driving situations classified in the classifying step include information relating to two lanes lateral to a lane of the motor vehicle.

8. The method according to claim 1, wherein the determining steps are performed in relation to two sides of the motor vehicle.

9. The method according to claim 1, further comprising one of (a) recording and (b) calculating an angle as an input variable for the warning in a travel plane of the motor vehicle substantially corresponding to the travel direction of the motor vehicle and a straight line that spans a sensor apparatus adapted to monitor the predetermined warning region and the object.

10. A device for monitoring a blind spot located at a side of a motor vehicle to warn a driver of the motor vehicle that an object is located in a predetermined warning region relative to the motor vehicle corresponding to the blind spot, comprising:
a sensor device adapted to monitor the predetermined warning region, the sensor device defining a sensor region that includes the predetermined warning region, the sensor device adapted to determine a travel direction of the object relative to the motor vehicle, a relative speed between the object and the motor vehicle and a position of the object relative to the motor vehicle; and
a control unit adapted to evaluate determined data; and
a warning system configured to output a warning signal to the driver as a function of evaluation of the determined data;
wherein the warning system is configured to output the warning signal if: (a) the travel direction of the object corresponds to a travel direction of the motor vehicle; (b) the relative speed between the object and the motor vehicle is within a predetermined range bounded by a lower range boundary and an upper range boundary, the predetermined range including a zero value: and (c) the position of the object is within the predetermined warning region.

11. The device according to claim 10, wherein the control unit includes a memory adapted to store classified driving conditions and a comparator adapted to compare a current driving condition, ascertained by the control unit from the data of the sensor device, to the classified driving conditions.

12. The device according to claim 10, wherein the sensor device is arranged one of (a) in side mirror of the motor vehicle, (b) in a rear bumper of the motor vehicle, (c) in an outer mirror of the motor vehicle and (d) in a rear light of the motor vehicle.

13. The device according to claim 10, further comprising means for performing a method, including:
determining the relative speed between the object and the motor vehicle;
determining the travel direction of the object relative to the motor vehicle;
determining the position of the object relative to the motor vehicle; and
warning the driver if: (a) the travel direction of the object corresponds to a travel direction of the motor vehicle; (b) the relative speed between the object and the motor vehicle is within a predetermined range bounded by a lower range boundary and an upper range boundary, the predetermined range including a zero value: and (c) the position of the object is within the warning region.

14. A device for monitoring a blind spot located at a side of a motor vehicle to warn a driver of the motor vehicle that an object is located in a predetermined warning region relative to the motor vehicle corresponding to the blind spot, comprising:
means for determining a relative speed between the object and the motor vehicle;
means for determining a travel direction of the object relative to the motor vehicle;
means for determining a position of the object relative to the motor vehicle; and
means for warning the driver if: (a) the travel direction of the object corresponds to a travel direction of the motor vehicle; (b) the relative speed between the object and the motor vehicle is within a predetermined range bounded by a lower range boundary and an upper range boundary, the predetermined range including a zero value: and (c) the position of the object is within the predetermined warning region.

* * * * *